United States Patent [19]

Turrel

[11] Patent Number: 6,082,248
[45] Date of Patent: Jul. 4, 2000

[54] PORTABLE HEAT-CONCENTRATING KETTLE COOKER

[75] Inventor: Howard E. Turrel, Grove, Okla.

[73] Assignee: Concessions Manufacturing Ltd., Grove, Okla.

[21] Appl. No.: 09/104,673

[22] Filed: Jun. 25, 1998

[51] Int. Cl.[7] .................................................. A47J 27/00
[52] U.S. Cl. ..................... 99/323.9; 99/323.5; 99/323.11
[58] Field of Search ...................... 126/343.5 R, 343.5 A, 126/345, 349; 99/443 R, 323.9, 323.5, 323.11

[56] References Cited

U.S. PATENT DOCUMENTS

| | | | |
|---|---|---|---|
| 1,248,234 | 11/1917 | Worth | 99/323.9 |
| 1,449,687 | 3/1923 | Marfisi | 99/323.9 |
| 1,457,854 | 6/1923 | Parks | 99/323.5 |
| 1,594,190 | 7/1926 | Barnard | 99/323.9 |
| 2,117,872 | 5/1938 | Barnard | 99/323.5 |
| 2,537,744 | 1/1951 | Cretors | 99/323.9 |
| 4,138,937 | 2/1979 | De Weese | 99/323.5 |
| 4,702,158 | 10/1987 | Ishihara | 99/323.5 |
| 5,857,403 | 1/1999 | Mann | 99/323.5 |

*Primary Examiner*—Ira S. Lazarus
*Assistant Examiner*—Sara Clarke
*Attorney, Agent, or Firm*—Vorys Sater Seymour & Pease LLP

[57] ABSTRACT

A cooker is shown having a housing with a burner supported within the housing and a kettle carrier pivotally attached to a top edge of the housing such that it can be pivoted from a substantially horizontal position across the top of the housing to a substantially vertical position. The kettle carrier includes a cooking kettle that is positioned over the burner when the kettle carrier is in its substantially horizontal position, and when the kettle carrier is in its substantially vertical position, the cooker kettle is positioned to empty its contents into a tub that is supported next to the housing by a detachable frame extending from the housing. Additional features of the cooker include a heat intensification chamber formed by a wall around the burner in order to redirect radiant energy from the burner back into the heat intensification chamber. A cooking oil receptacle is also detachably mounted to the housing. Fuel supplied to the heater can be natural gas, propane, or electricity, with fuel supply lines passing through a fuel supply/control chamber at the front of the housing and fuel regulating controls positioned on the front of the housing.

6 Claims, 10 Drawing Sheets

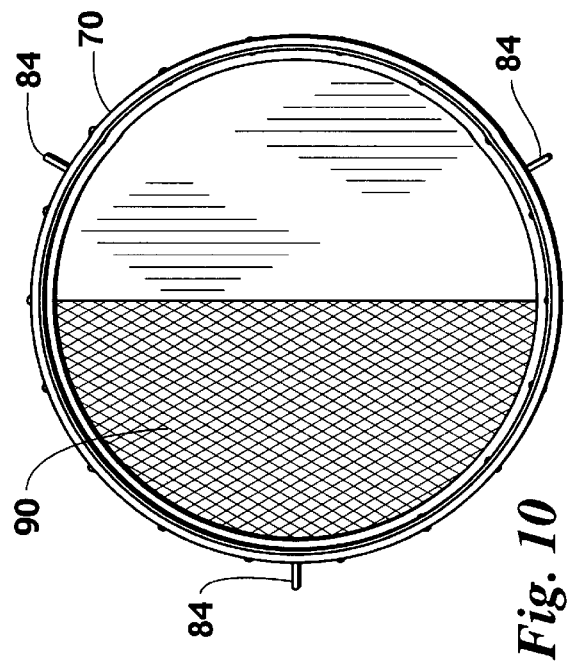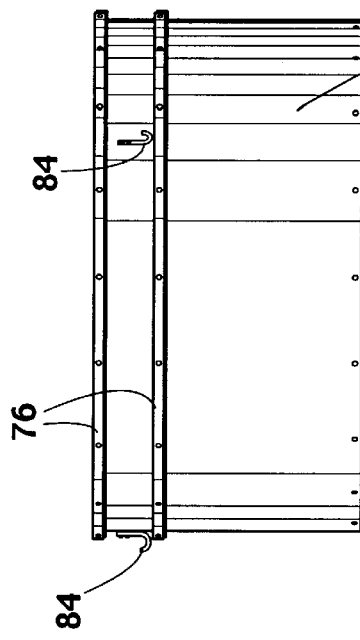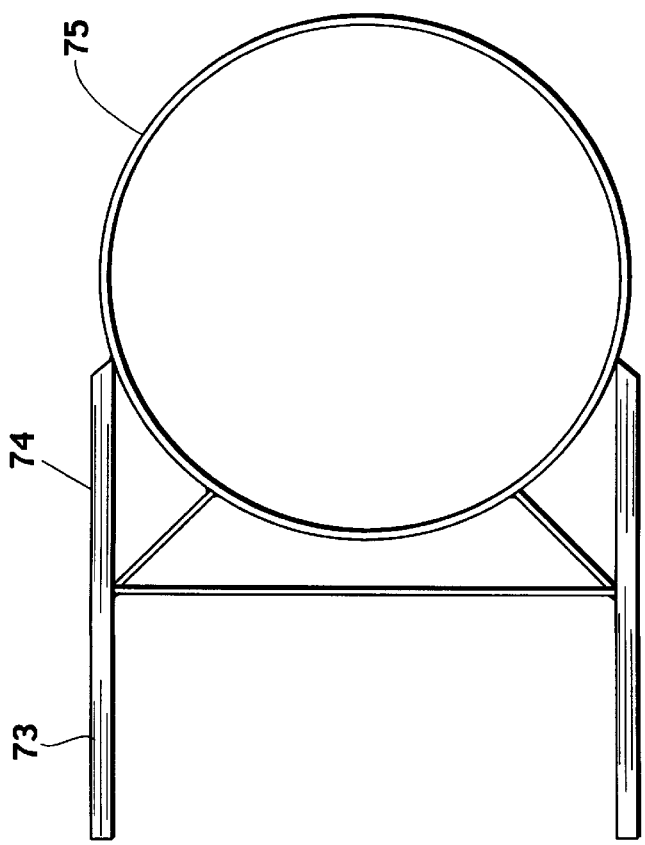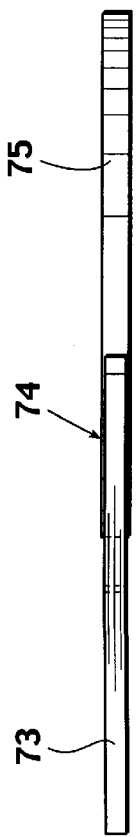

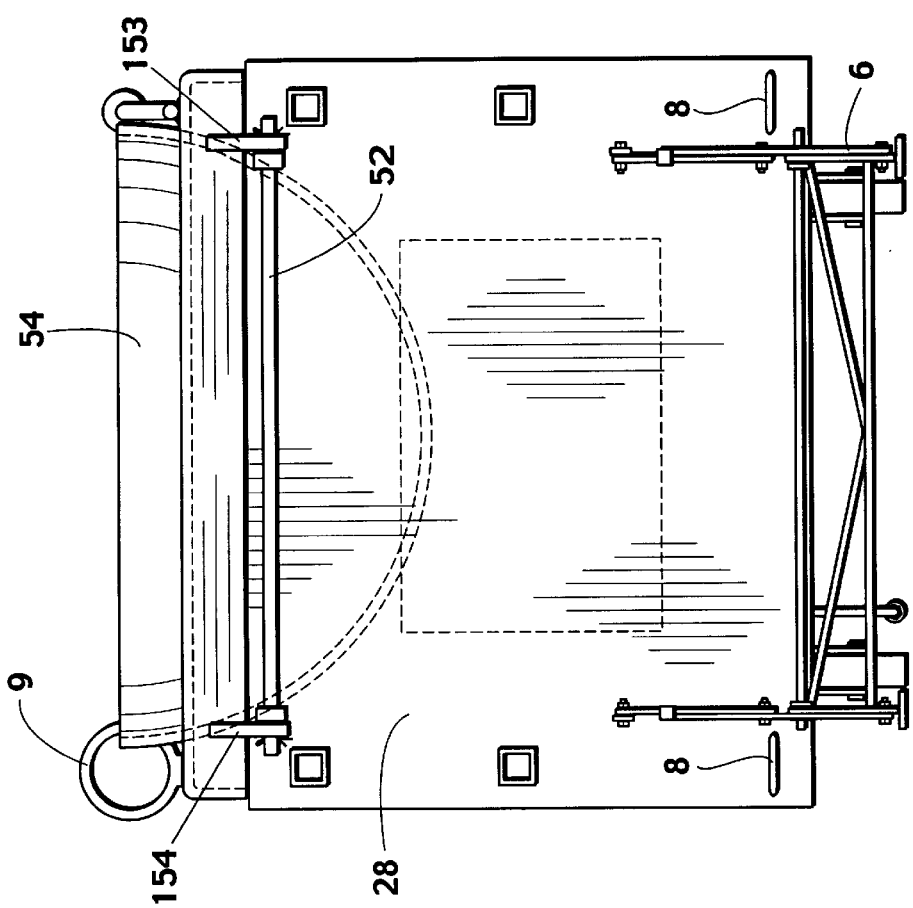
Fig. 14
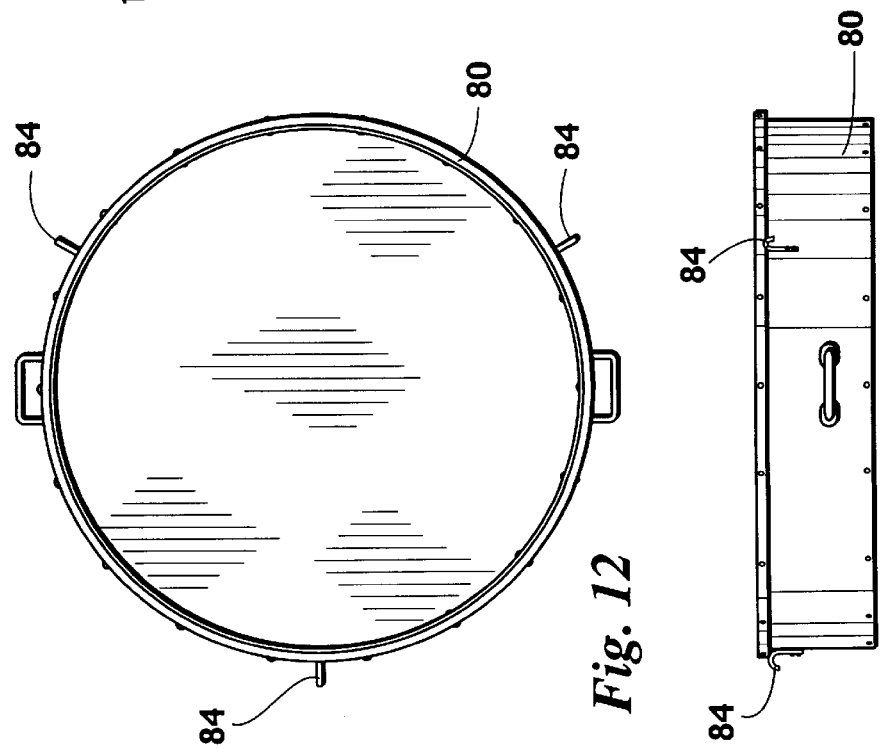
Fig. 12
Fig. 13

PORTABLE HEAT-CONCENTRATING KETTLE COOKER

BACKGROUND OF THE INVENTION

1. Field of the invention

This invention relates to a cooker adapted for the commercial preparation of popcorn and the like. More particularly, the invention is directed to a portable cooker which is capable of intensifying the cooking temperature within a kettle included in the cooker such that the ingredients contained therein are economically processed and then conveniently discharged for subsequent use or sale.

2. Brief Description of the Prior Art

The preparation and dispensing of freshly cooked hot foods, especially popcorn, is commonly found at recreational gatherings, particularly outdoor events such as large picnics, fairs, carnivals, races, and the like. Consequently, a number of cookers have been developed for preparing and dispensing freshly popped popcorn.

Certain types of popcorn makers have been developed which heat the kernels by using a hot air stream. However, for making large batches of popcorn, particularly at outdoor gatherings, it is more conventional to pop the corn in a heated pan or kettle.

Accordingly, conventional large scale popcorn poppers include a relatively large heated kettle or bowl which is charged with a measured amount of popping corn and cooking oil. The kettle or bowl may have a hinged lid, which is opened to permit loading of the unopened kernels, closed to contain the corn while popping, and opened again to allow unloading of the popped corn. The bowl is typically mounted on a pivot to permit dumping the finished popcorn into a tub or suitable container from which individual packages or bags of popcorn can be filled.

Kettle cookers that are heated by open flames have hitherto been somewhat inefficient because the flame tends to be dissipated over a large fraction of the kettle surface and, accordingly, does not produce the high temperatures needed in the cooking operations.

Some of these conventional commercial popcorn cookers use pans or bowls that are heated by electric heating elements which are in direct contact with the bowl, typically over a relatively large area of the bowl. Although this method of heating allows for efficient heat transfer, it has certain disadvantages as well. In outdoor locations it is usually inconvenient to provide the high-power electric service needed for such heavy-duty commercial poppers. Furthermore, for some types of popcorn, e.g., comprising special formulas wherein the popcorn is cooked with sugar and salt, a cooking temperature which is higher than usual is desired. In using conventional methods and apparatus, producing such a higher temperature in the cooking bowl is difficult to achieve.

Furthermore, concessionaires who supply confections at assemblies, and the like, need a cooker that is designed to be easily portable and convenient to set up and operate.

Accordingly, a need has continued to exist for a portable cooker for popcorn and other confections that provides an efficient, economical, high-temperature cooking kettle and is easy to transport, set up and operate.

SUMMARY OF THE INVENTION

The difficulties described above, particularly those dealing with the setup and economical operation of portable commercial popcorn cookers, have been alleviated by the cooker of this invention.

The cooker described and claimed herein comprises a housing adaptable for portable use, a heater such as a gas burner or electric heating element supported within the housing, a kettle carrier pivotably attached to a top edge of the housing and having a cooking kettle mounted therein, and a tub supported next to the housing by a detachable frame extending from the housing. The burner, or the like, is surrounded by a heat-intensifying shield that serves to concentrate the heat in a central area of the lower portion of the cooking kettle. The kettle carrier is pivotable, moving from a substantially horizontal position across the top of the housing such that the kettle is positioned over the burner, to a substantially vertical position whereby the contents of the cooking bowl may be discharged into the dispensing tub. The kettle carrier is biased towards the vertical position by a biasing means for ease in discharging the finished batch of popcorn or the like. The tub is provided with a screen bottom and a waste receptacle detachably mounted below the tub for easy separation and removal of waste material, such as unpopped kernels. The tub can be removed from the support frame and positioned on the top of the housing, together with the waste receptacle, over the cooking kettle, thus permitting the apparatus to be more easily transported. The housing also conveniently includes a chamber for the fuel supply lines and controls for regulating the flow of fuel to the burner. The housing is preferably provided with casters for ease of transportation and with retractable legs to stabilize the housing during operation.

Accordingly, it is an object of the invention to provide a cooker for economically preparing popcorn and similar cooked foods.

A further object is to provide a cooker that makes efficient use of the energy used to heat the kettle.

A further object is to provide a cooker that incorporates a heat intensifier.

A further object is to provide a cooker that is easily transportable.

A further object is to provide a popcorn cooker that is convenient for use at outdoor gatherings, as well as mall's, shopping centers, and various other temporary and/or permanent locations.

A further object is to provide a cooker that incorporates a dispensing tub for the cooked food.

A further object is to provide a cooker with a convenient dispensing tub and waste receptacle.

Further objects of the invention will become apparent from the description of the apparatus which follows.

DESCRIPTION OF THE PREFERRED EMBODIMENTS

Additional features of this invention will be apparent from a study of the detailed description and the accompanying drawings wherein like reference numbers represent like features and wherein:

FIG. 8 shows a top plan view of a detachable frame for supporting the tub of the present invention;

FIG. 9 shows a side elevation view of the detachable frame shown in FIG. 8;

FIG. 10 shows a top plan view of the tub according to an embodiment of the present invention;

FIG. 11 shows a side elevation view of the tub shown in FIG. 10;

FIG. 12 shows a top plan view of a waste receptacle to be mounted below the tub as shown in FIGS. 6 and 7;

FIG. 13 shows a side elevation view of the waste receptacle shown in FIG. 12;

FIG. 14 shows a rear elevation view of the cooker assembly with the tub and detachable frame removed from the housing showing the retractable legs.

DETAILED DESCRIPTION OF THE PREFERRED EMBODIMENTS

Figure 1:
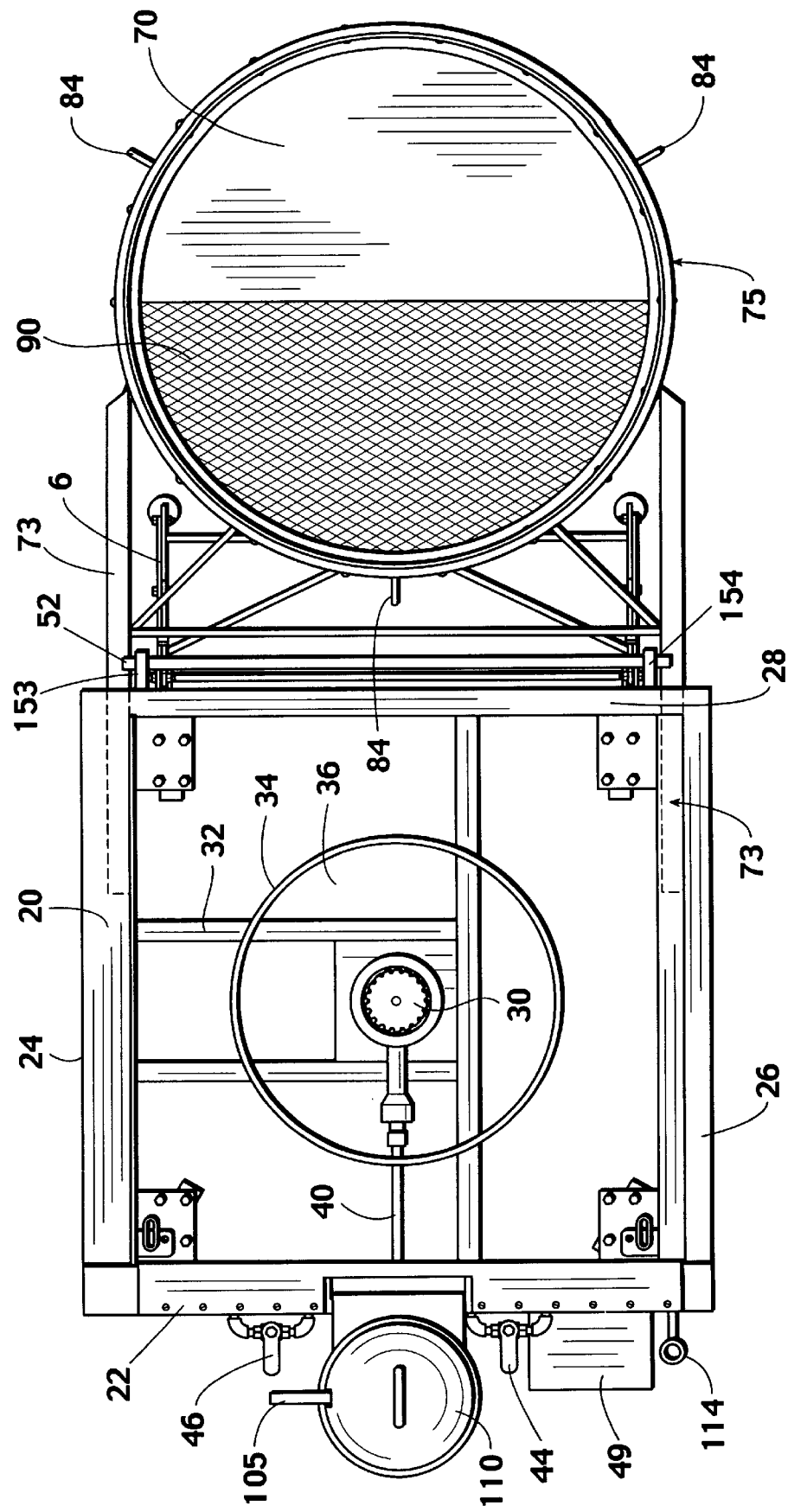
FIG. 1 shows a top plan view of an embodiment of the present invention with the kettle carrier and kettle removed.

FIG. 1 shows a top plan view of an embodiment of the present invention with the kettle and kettle carrier removed in order to illustrate various features of the invention. A housing (20) includes a front wall (22), left and right side walls (24), (26), and a rear wall (28). In the illustrated embodiment right side wall (26) is louvered to allow venting and relief of the heat generated within the housing. A burner (30) is supported in housing (20) by a burner support bracket (32) extending into the interior of housing (20). An intensification chamber wall (34) can be provided around burner (30) in order to redirect radiant energy from burner (30) back into a heat intensification chamber (36). Intensification chamber wall (34), defining heat intensification chamber (36), is substantially cylindrical in shape and is provided with an opening therethrough for allowing passage of fuel supply lines (40). The heat intensification chamber (36) concentrates the heat from the burner (30) in the central portion of the bottom of the cooking kettle (54). This provides for efficient heat transfer to the kettle (54) with the consequence that the cooker uses less energy. Consequently, the heat intensification chamber (36) intensifies the temperature and saves energy by concentrating the intensified heat directly at the cooking area at the lowest portion of the kettle. The more efficient heat transfer produced by the heat intensification chamber (36) also reduces the flame on-time of the burner (30), thereby saving energy.

Figure 2:
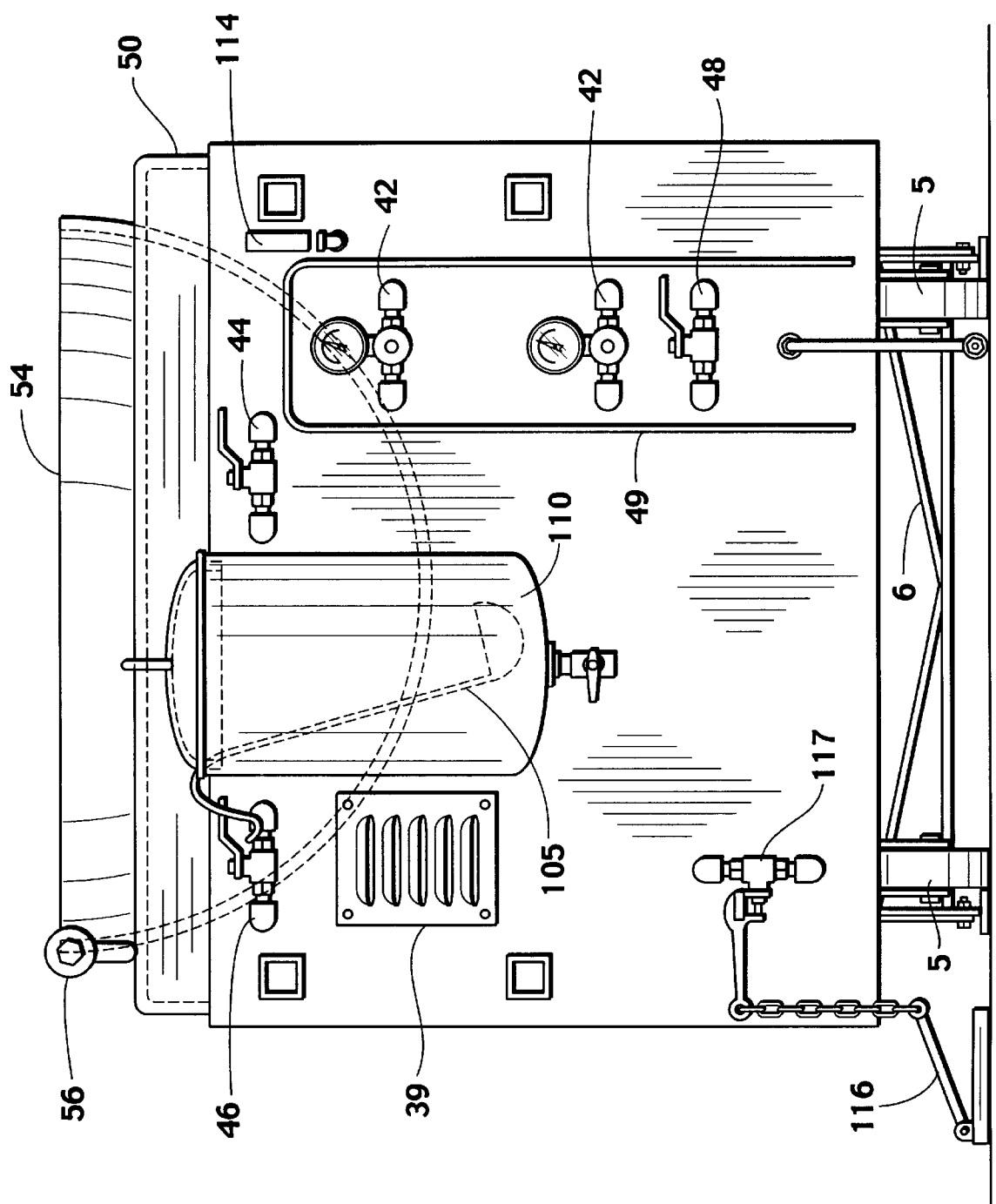
FIG. 2 shows a front elevation view of the cooker assembly of FIG. 1.
Figure 6:
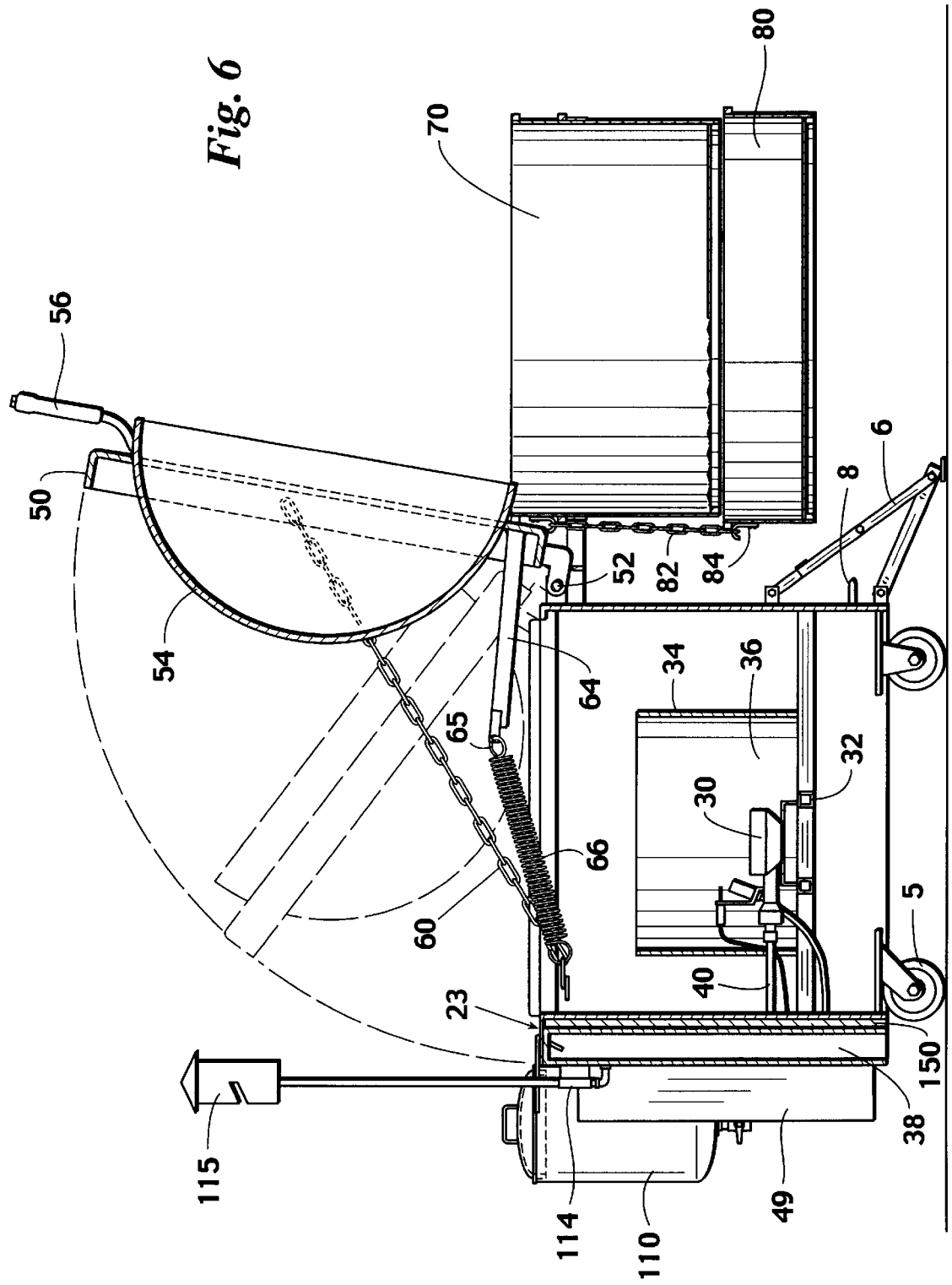
FIG. 6 shows a side elevation view, partially cut away, similar to FIG. 5, but with the kettle carrier pivoted to a substantially vertical position to empty the contents of the kettle into the tub.
Figure 7:
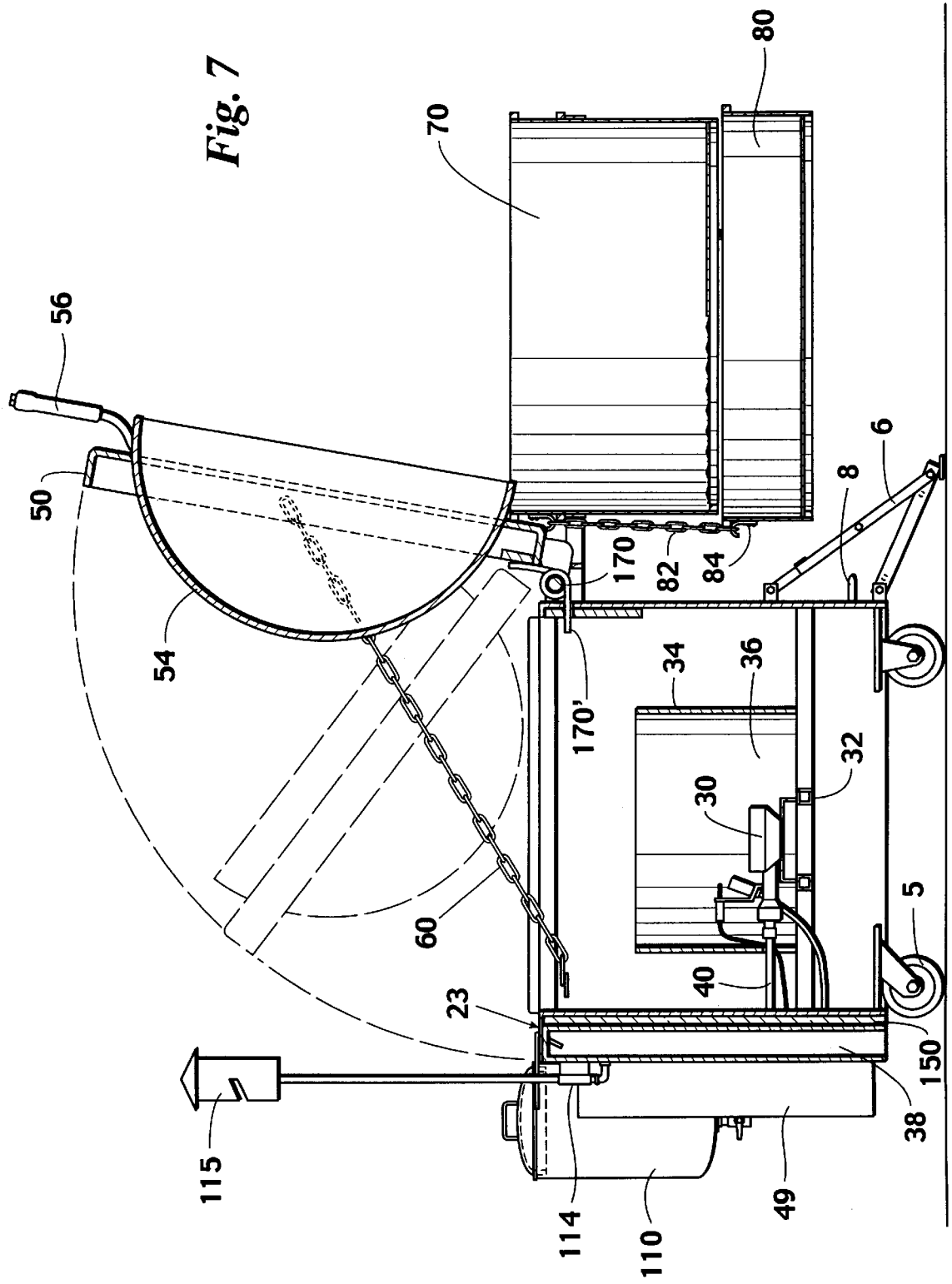
FIG. 7 shows a side elevation view of an embodiment of the invention similar to the embodiment shown in FIG. 6, but with a torsion spring rather than a tension spring biasing the kettle carrier to its substantially vertical position.

A fuel supply and control chamber (38), best seen in FIG. 7, is formed between front wall (22) and a second inner wall (23). The supply of fuel to burner (30) through fuel supply lines (40) is controlled by fuel pressure regulators (42), best seen in FIG. 2, safety shut-off value (48), flame adjustment valve (44), and rapid on/off flame valve (46), which are mounted on front wall (22) and connected to fuel supply lines within fuel supply/control chamber (38). A heavy-duty exterior metal guard (49) surrounds and protects the pressure regulators (42) and safety shut-off valve (48) on the front of the cooker. A heat shield (150), best seen in FIG. 6, on the inner surface of inner wall (23) protects the fuel supply lines (40) and fuel pressure regulators (42) from becoming overheated. Furthermore, the fuel supply control chamber (38) is provided with a vent, (39) as best seen in FIG. 2 located in the front wall (22) of the housing (20), to prevent the fuel supply/control chamber (38) from becoming overheated. The combination of front wall (22), inner wall (23) and heat shield (150) also protects the operator from the intense heat of the burner (30).

The cooker of the invention is preferably equipped with a gas safety valve with pilot light and thermal coupler, of generally conventional design (not shown). The pilot light assures automatic ignition of the burner whenever it is turned on. The thermal coupler and gas safety valve provide an extra measure of safety by preventing the escape of flammable gas. If the pilot light goes out, the gas safety valve closes automatically, and thereby shuts the system down to prevent the escape of unburned flammable gas, even if all the other controls have been left in the on position. The pilot light and thermal coupler are located relatively close to the burner, according to conventional practice. The automatic gas safety valve is conveniently located on the inside of front wall (22) and is housed in the fuel supply/control chamber (38). Such a location assures that the gas safety valve is protected from the intense heat of the burner (30) by the heat shield (150), along with the fuel lines, regulators, and the like.

Although the burner (30) and fuel supply and control valves shown in the figures are for use with natural gas or propane, an alternative embodiment could include an electric heating in place of gas burner (30) and an electric rheostat regulator and electrical switches to control the supply of electricity to the electric heater.

In the most preferred embodiment of this invention the fuel pressure regulators (42) are set so that the burner (30) operates in a temperature range between about 50,000 to about 400,000 BTU at a pressure between 3 psi and 11 psi.

Gas supply lines or electric lines housed within fuel supply control chamber (38) are protected from heat generated by burner (30) with a heat shield (150), best seen in FIG. 6, positioned between fuel supply control chamber (38) and the interior of housing (20) surrounding the heat intensification chamber (36).

As best seen in FIG. 6, a kettle carrier (50) is pivotally attached along housing (20) by a pivot rod (52) that is rotatively supported in flanges (153 & 154), best seen in FIG. 14, extending rearwardly from rear wall (28) of housing (20). The kettle carrier (50) pivots about pivot rod (52) from a substantially horizontal position across the top of housing (20) to a substantially vertical position, as shown in FIG. 6. Kettle carrier (50) supports a cooking kettle (54) that is positioned on the kettle carrier (50) such that it will be centered over burner (30) when the kettle carrier (50) is in a substantially horizontal position. Cooking kettle (54) can be formed from aluminum, steel, stainless steel, cast iron, or any other material having a good heat conductivity, and can be coated on the inside with a fluorocarbon polymer or other material to prevent food from sticking to the cooking kettle (54). A heat insulated handle (56) is also connected to kettle carrier (50) and is grasped by an operator when pivoting kettle carrier (50) about pivot rod (52).

The cooking kettle (54) can also be provided with a removable cover, not shown, to confine the popping corn within the kettle while the popcorn is being cooked.

A biasing means and a stop means can also be provided between kettle carrier (50) and housing (20) in order to facilitate the movement of kettle carrier (50) from its horizontal position to its vertical position, and to prevent kettle carrier (50) from moving beyond a desired emptying position, as shown in FIG. 6, at which any contents in cooking kettle (54) will slide easily from the cooking kettle (54). In the embodiment shown in FIG. 6, the stop means is a chain (60) extending from housing (20) to kettle carrier (50), and preventing motion of kettle carrier (50) past an emptying position. A biasing mechanism for facilitating motion of kettle carrier (50) from its horizontal position to its emptying position includes a tension spring (66), an arm (64) extending from the bottom of kettle carrier (50), and an adjustable connector (65) between one end of tension spring (66) and the distal end of arm (64). When kettle carrier (50) is in a substantially horizontal position across the top of housing (20), arm (64) extends downwardly into housing (20) and tension spring (66) is adjusted through adjustable connector (65) to apply a slight torque on arm (64), and hence kettle carrier (50) to bias the kettle carrier (50) towards its emptying position.

Figure 15:
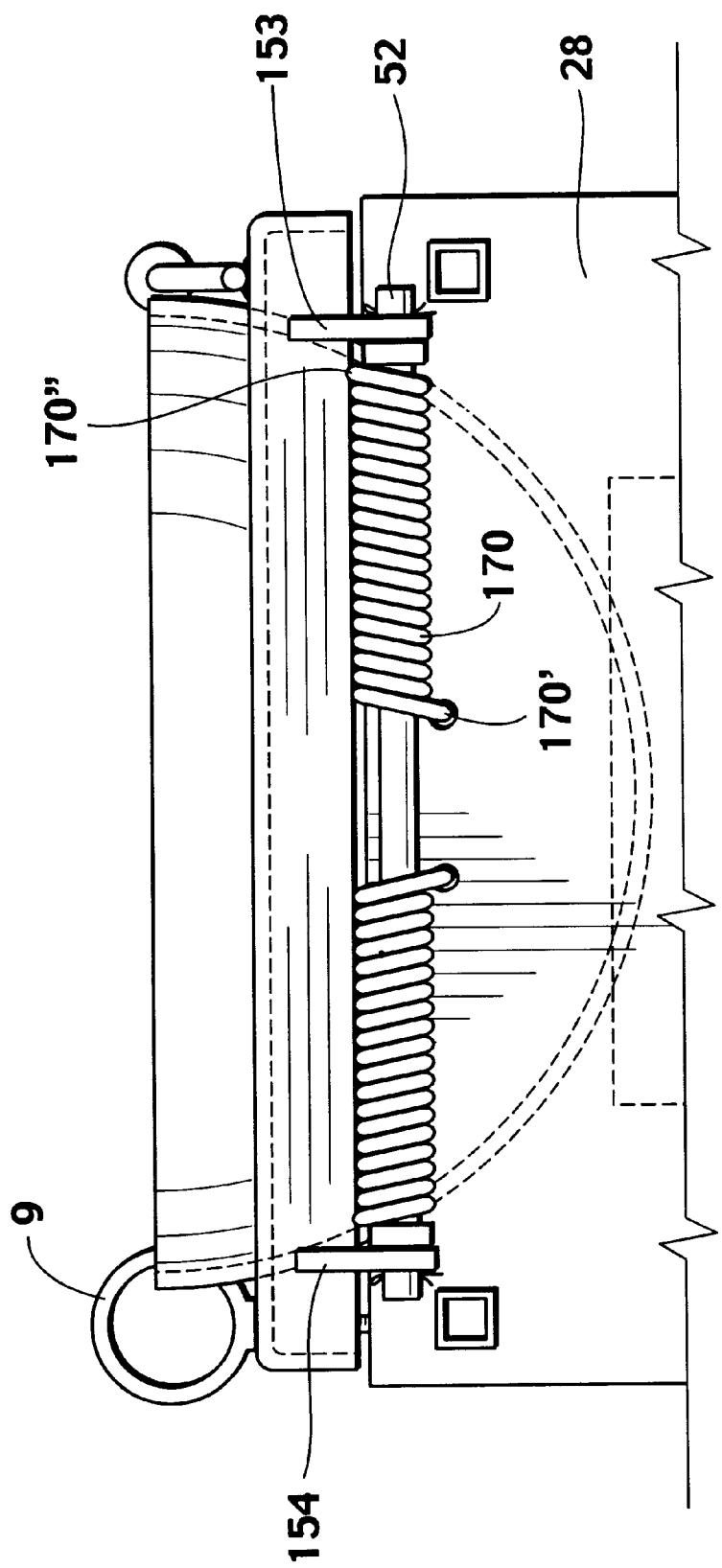
FIG. 15 shows a detailed elevation view of the torsion springs used to bias the kettle carrier from a horizontal position to a vertical position.

In an alternative embodiment, as best seen in FIGS. 7 and 15, a biasing means for kettle carrier (50) includes a torsion spring (170) that is wrapped around pivot rod (52), with a first end (170') of torsion spring (170) being anchored in a hole in rear wall (28) of housing (20). Torsion spring (170) is pre-stressed with a second end (170") pressing against a bottom edge of kettle carrier (50) in order to bias kettle carrier (50) towards its emptying position. Alternatively, the second end (170") of torsion spring (170) can be anchored to the kettle carrier (50) by being inserted into a hole drilled into the kettle carrier (50) in a manner similar to the anchoring of the first end (170') to the housing (20). In such an embodiment (not shown), support tubes may be provided within the kettle carrier (50) to receive the second end (170") of the torsion spring (170) which can thereby exert its biasing force against the support tubes. A biasing means using either tension springs (66) or torsion springs (170) facilitates a smooth swinging motion of kettle carrier (50) about pivot rod (52) as an operator exerts an upward force on insulated handle (56). Consequently, the entire cooking kettle or bowl (54) can pivot to discharge the cooked contents with very little effort by the operator. In order to hold the kettle carrier (50) firmly in position during the cooking cycle, a lock, not shown, can be provided that is engaged when the kettle carrier (50) is returned to the horizontal position and can be released by the operator before raising the kettle carrier (50) with the heat insulated handle (56).

When cooking kettle (54) is moved to its emptying position, as shown in FIGS. 6 and 7, the contents within cooking kettle (54) are emptied into a tub (70). Tub (70) is held in a proper position for receiving the contents from cooking kettle (54) by a tub holder assembly (74), best seen in FIGS. 8 and 9. Tub holder assembly (74) is supported on housing (20) by legs (73) that extend through openings in rear wall (28) of housing (20) and along the interior of side walls (24) and (26) as best seen in FIG. 1.

A hoop (75) of tub holder assembly (74) has an inner diameter that is slightly larger than the outer diameter of tub (70). Tub rings (76), as seen in FIG. 11, are attached around an outer circumference of a top edge of tub (70) and have an outer diameter that is larger than the inner diameter of hoop (75). When tub holder assembly (74) is mounted on housing (20), hoop (75) supports tub (70) in the proper position for receiving contents from cooking kettle (54) by resting underneath a tub ring (76).

Tub (70) can be made from copper, stainless steel, or another sanitary and attractive material for receiving food products.

Figure 4:
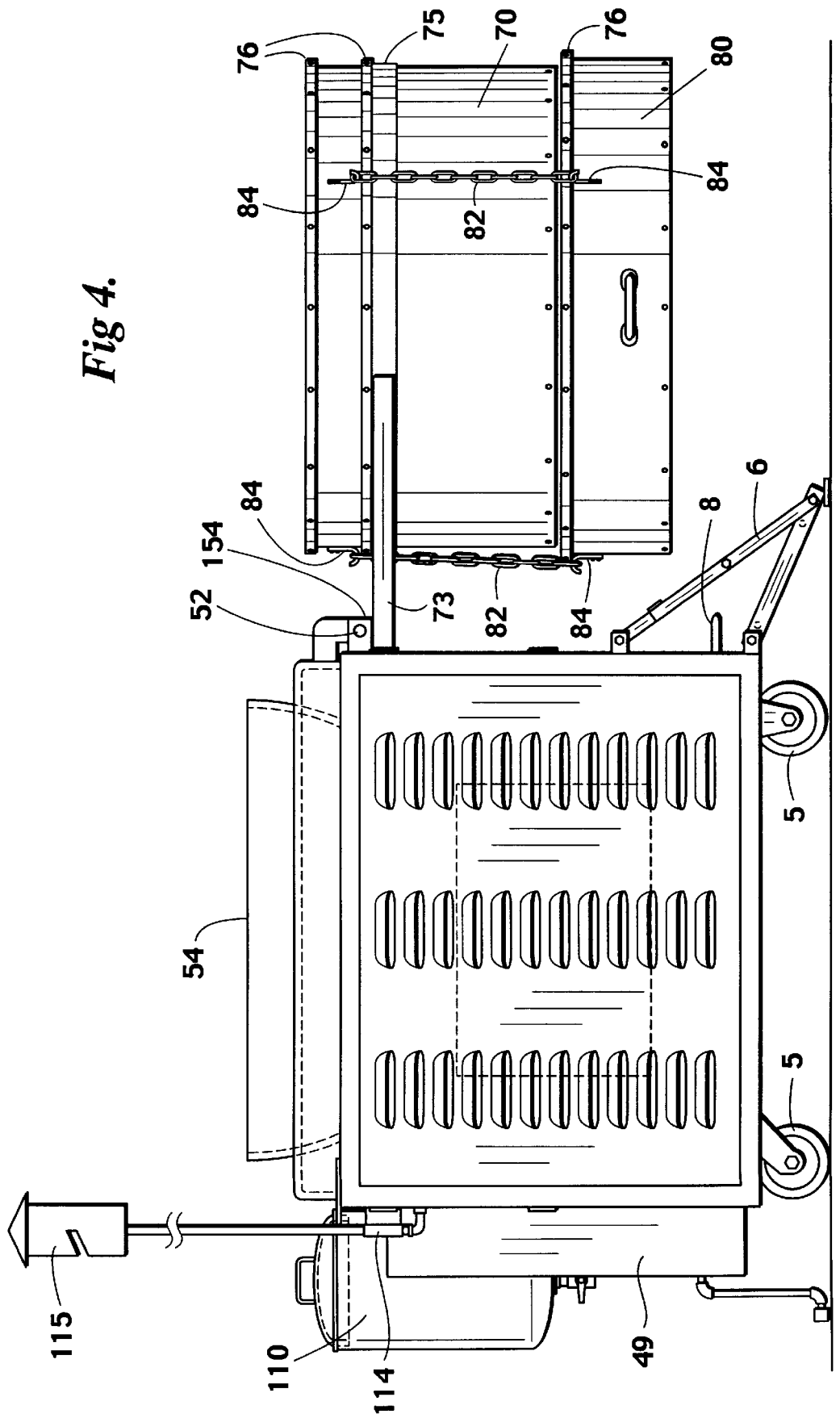
FIG. 4 shows a side elevation view of the cooker assembly shown in FIG. 1.
Figure 5:
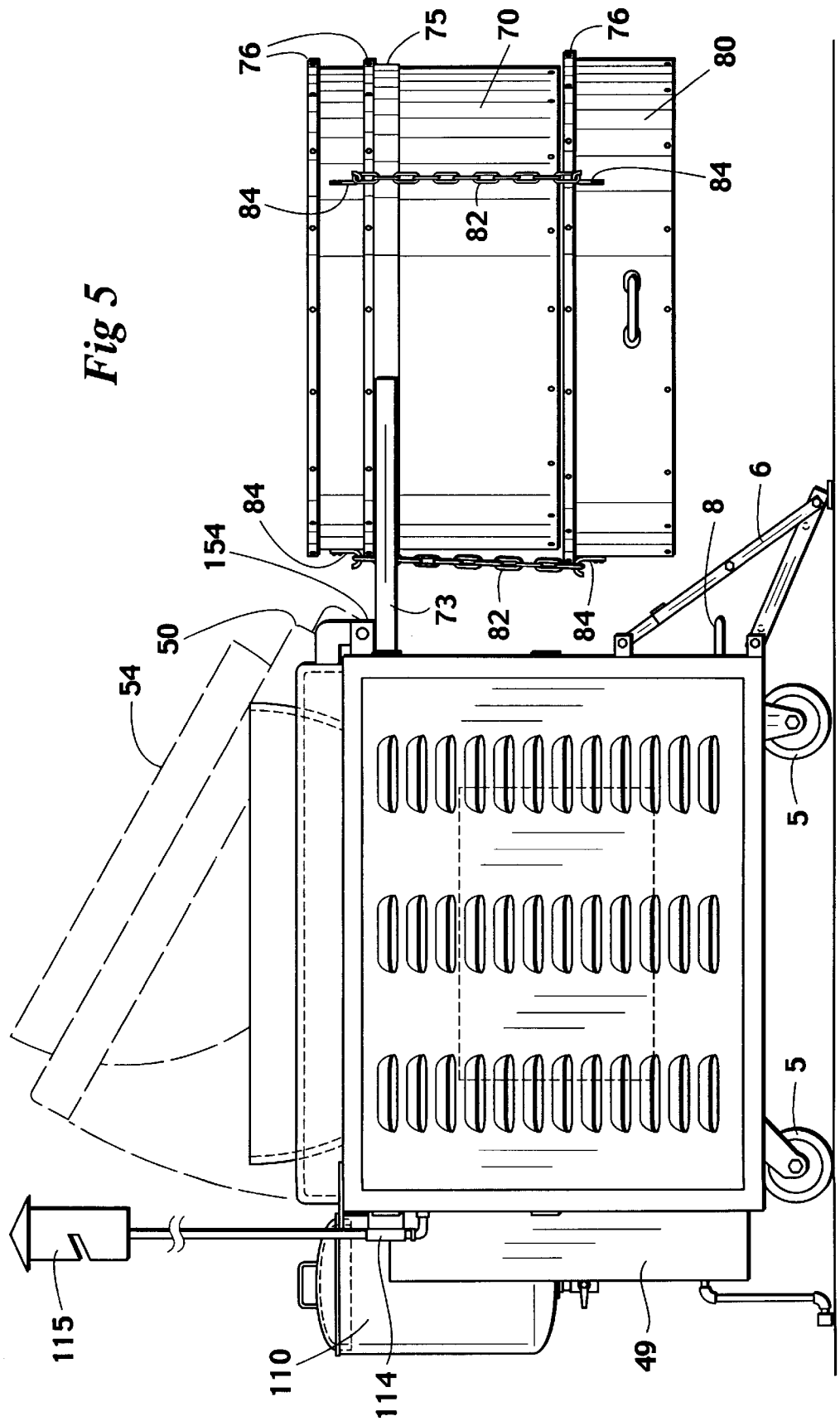
FIG. 5 shows a side elevation view of the cooker assembly shown in FIG. 4, showing the initial motion of the kettle carrier as it is pivoted from its horizontal position.

A screen (90), shown in FIGS. 1 and 10, is provided across the bottom of tub (70) and has a mesh that allows waste products such as unpopped corn kernels to fall through to a waste receptacle (80), best seen in FIGS. 12 and 13. Any screen structure is suitable provided it retains the popped kernels and allows the waste products to fall through into waste receptacle (80). The screen preferably has apertures of about 5/16 inch. The screen may be, e.g., woven screen having a mesh size of about 5/16 inch or metal plate having a pattern of holes of about 5/16 inch diameter formed therein by punching, drilling, or the like. Waste receptacle (80) is typically made of the same material as the tub (70), but has a solid bottom to contain the unpopped kernels or other waste material that may pass through the screen (90) on the bottom of tub (70). The waste receptacle (80) is of generally cylindrical shape like the tub (70) but has a diameter slightly larger than the diameter of tub (70). Accordingly, the waste receptacle can be inverted and slipped over the tub when the tub is placed on top of the apparatus when the cooker is transported. The waste receptacle (80) is provided with handles for ease of carrying and dumping the waste material. The waste receptacle (80), is supported below tub (70), as best seen in FIGS. 4 and 5, by chains (82) and hooks (84) attached to the sides of tub (70) and waste receptacle (80).

The cooker of the invention is also provided with auxiliary features that improve its utility. A detachable cooking oil receptacle (110) provides a convenient supply of cooking oil which is ladled into the cooking kettle (54) before each charge of popcorn or the like is added to the cooking kettle (54). The cooking oil receptacle (110) is provided with a drain as shown in FIG. 2 for convenient draining and cleaning of the oil receptacle (110).

A description of the use of the cooker according to the present invention to produce popcorn follows. With kettle carrier (50) in a substantially horizontal position across the top of housing (20), cooking kettle (54) is positioned over burner (30) and heat intensification chamber (36). Safety shut-off valve (48) is opened to allow gas into the fuel supply lines (40) and fuel supplied to burner (30) is controlled using fuel pressure regulator (42), flame adjustment valve (44), and rapid on/off flame valve (46). Cooking oil is measured from a cooking oil receptacle (110) using a ladle (105) and added to cooking kettle (54). After a certain amount of time popcorn is added to the oil and agitated with a mixing paddle until popping begins. A specific amount of flavoring, such as sugar, can be added to cooking kettle (54) and paddle agitation is continued in a spiral pattern. The cooking is completed using a clock to determine the desired preparation time. Next, the heat is turned off by turning off rapid on/off flame valve (46). A certain amount of salt is then spread on the corn and cooked into the corn as it is continually agitated until popping is finished. Next, an operator grasps heat insulated handle (56) to pivot kettle carrier (50) about pivot rod (52) and move cooking kettle (54) to its emptying position over tub (70). The popped corn falls into self screening tub (70), with any unpopped kernels of corn falling through screen (90) into waste receptacle (80). After the popped corn has cooled sufficiently in tub (70) it can be packaged as desired. After preparation of the popcorn is completed a whistle (115) can be sounded by pressing a whistle foot peddle (116) in order to release compressed air or propane through whistle valve (117) to the detachable whistle (115) which is attached to front wall (22) of housing (20) via the whistle mount bracket (114).

Figure 3:
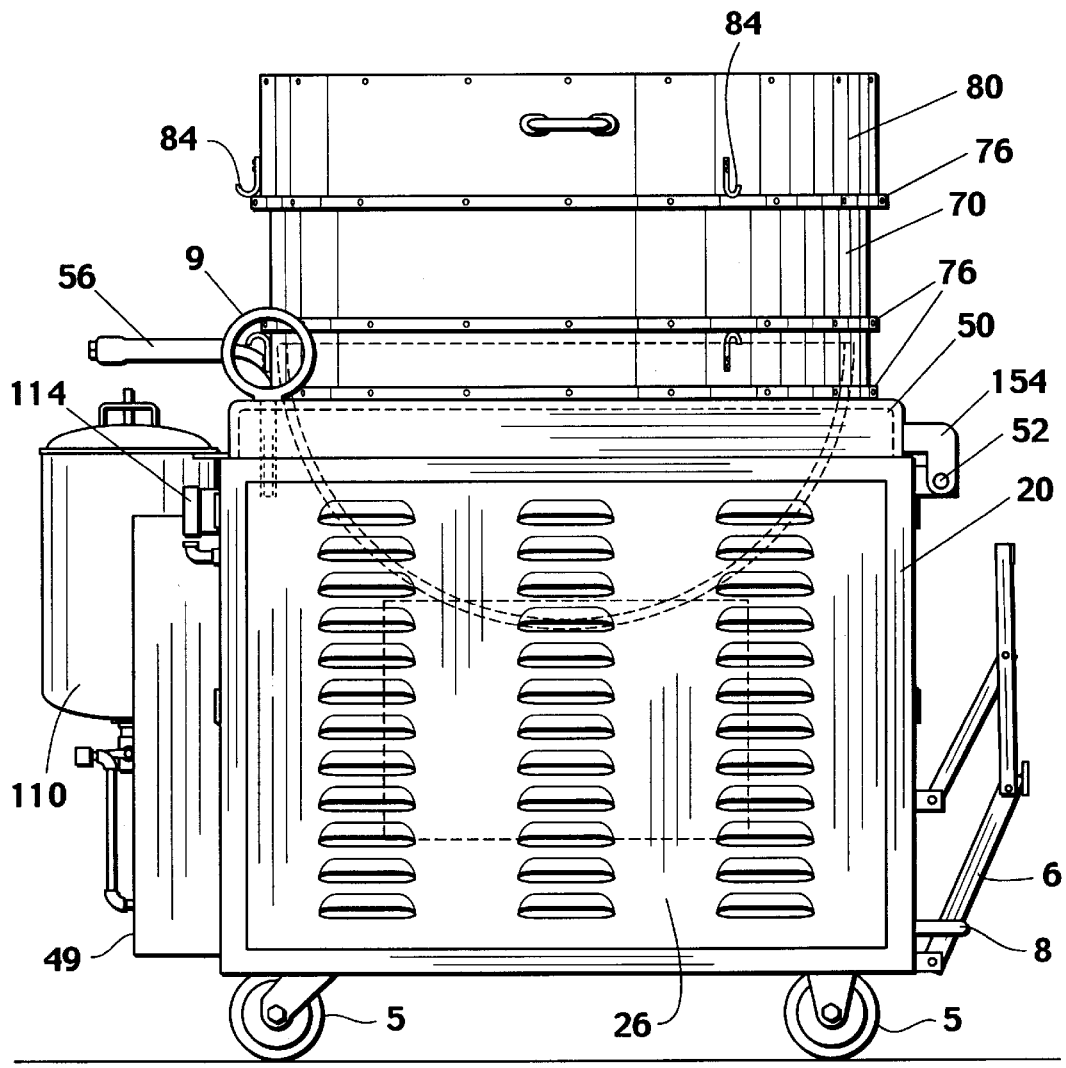
FIG. 3 shows a side elevation view of the cooker assembly according to an embodiment of the present invention with the tub and waste receptacle mounted in a transport position on top of the cooker assembly.

As shown in FIG. 3, the cooker according to the present invention is designed to be easily transportable, yet stable in use. Casters (5) are mounted on the bottom of the housing (20) with conventional brackets. In the illustrated embodiment two fixed casters and two swivel casters are used; however, four swivel casters could be used. In order to stabilize the cooker when it is set up for operation, and to support the rear of the cooker which carries the tub (70) and waste receptacle (80), legs (6) are provided that can be locked in a down or supporting position in contact with the ground (FIG. 4) and (FIG. 14). When the cooker is to be transported between uses, the lock-down legs (6) are folded up, and the tub (70) and waste receptacle (80) are placed in an upside down position on top of the kettle carrier (50). The entire cooker assembly can then be easily rolled on its casters (5) to a new location or to storage or the like. A locking device (9) is used to secure kettle carrier firmly to housing (20) during transport. Locking brackets (8) are also provided on the back of the cooker for locking the cooker firmly in a vehicle, e.g., a trailer, during transport.

The prior detailed description is of several preferred embodiments of the apparatus of this invention. Other embodiments will be apparent to one skilled in the art and are contemplated within the scope of the following claims.

What is claimed is:

1. A cooker comprising:

a housing having a top and at least one top edge;

a kettle carrier having a kettle mounted thereon, a bottom portion of said kettle comprising a cooking area;

pivot means mounted on said housing for pivotably attaching said kettle carrier to said top edge of said housing, whereby said kettle carrier is pivotable from a substantially horizontal position across said top of said housing to a substantially vertical position;

means for biasing said kettle carrier toward said substantially vertical position;

said biasing means comprising an arm having a proximal end rigidly attached to said carrier and a distal end positioned below said carrier is in its horizontal position, and a tension spring connected between said distal end of said arm and said housing;

a heater supported within said housing;

a heat intensification chamber defined by a chamber wall surrounding said heater;

said chamber wall having an top edge defining an opening which is positioned and dimensioned in relation to the bottom portion of said kettle when horizontally disposed so as to concentrate heat in the chamber on said bottom portion of the kettle;

a tub having an upper end which is open so as to receive cooked contents of said kettle when the kettle is disposed in a substantially vertical position; and tub-support means attached to said housing for mounting said tub adjacent to said housing.

2. A cooker comprising:

a housing having a top and at least one top edge;

a kettle carrier having a kettle mounted thereon, a bottom portion of said kettle comprising a cooking area;

pivot means mounted on said housing for pivotably attaching said kettle carrier to said top edge of said housing, whereby said kettle carrier is pivotable from a substantially horizontal position across said top of said housing to a substantially vertical position;

a gas burner supported within said housing;

a heat intensification chamber defined by a chamber wall surrounding said gas burner, said chamber wall having an top edge defining an opening which is positioned and dimensioned in relation to the bottom portion of said kettle, when horizontally disposed, so as to concentrate heat in the chamber on said bottom portion, said housing further including at least a front wall and a heat shield within said housing spaced between said front wall and said burner so as to define a fuel supply and control chamber, said fuel supply and control chamber containing gas supply lines that feed gas to said burner, said front wall of said housing supporting valves and regulators that control the supply of gas through gas supply lines to said burner, a tub having an upper end which is open so as to receive cooked contents of said kettle when the kettle is disposed in a substantially vertical position; and tub-support means attached to said housing for mounting said tub adjacent to said housing.

3. The cooker according to claim 2 wherein said burner is capable of supplying heat in an amount within the range of 50,000 BTU to about 400,000 BTU.

4. A cooker comprising:

a housing leaving a top and at least one top edge;

a kettle carrier having a kettle mounted thereon, a bottom portion of said kettle comprising a cooking area;

pivot means mounted on said housing for pivotably attaching said kettle carrier to said top edge of said housing, whereby said kettle carrier is pivotable from a substantially horizontal position across said top of said housing to a substantially vertical position;

a heater supported within said housing;

a heat intensification chamber defined by a chamber wall surrounding said heater; said chamber wall having an top edge defining an opening which is positioned and dimensioned in relation to the bottom portion of said kettle when horizontally disposed so as to concentrate heat in the chamber on said bottom portion of the kettle;

a tub having (a) an upper end which is open so as to receive cooked contents of said kettle when the kettle is disposed in a substantially vertical position; and (b) a bottom portion that is formed, at least in part, of a screen;

a waste receptacle provided with hooks and being detachably mounted to said tub by links connected between said hooks, and tub-support means attached to said housing for mounting said tub adjacent to said housing.

5. The cooker according to claim 4 wherein said links are chain links.

6. A cooker comprising:

a housing having a top and at least one top edge;

a kettle carrier having a kettle mounted the-eon, a bottom portion of said kettle comprising a cooking area;

pivot means mounted on said housing for pivotably attaching said kettle carrier to said top edge of said housing, whereby said kettle carrier is pivotable from a substantially horizontal position across said top of said housing to a substantially vertical position;

a heater supported within said housing;

a heat intensification chamber defined by a chamber wall surrounding said heater, said chamber wall having an top edge defining an opening which is positioned and dimensioned in relation to the bottom portion of said kettle when horizontally disposed so as to concentrate heat in the chamber on said bottom portion of the kettle;

a tub having an upper end which is open so as to receive cooked contents of said kettle when the kettle is disposed in a substantially vertical position, and including a detachable tub-supporting frame; and frame mounting means on said housing for detachable mounting said tub-supporting frame on said housing, said detachable tub-supporting frame including a generally circular hoop having an inner diameter and legs extending from said hoop that are detachably connected to said frame mounting means, whereby said hoop is supported in a substantially horizontal plane, and said tub has a generally circular cross section and an outer diameter slightly smaller than said inner diameter of said hoop, said tub being provided with an external tub ring extending at least part way around said tub, said tub ring having an outer diameter larger than said inner diameter of said hoop, whereby said tub ring rests on said hoop to support said tub.

* * * * *